United States Patent [19]

Lehmann et al.

[11] 3,960,595

[45] June 1, 1976

[54] ELECTROCHEMICAL GENERATOR

[75] Inventors: Gerard Lehmann, Liguge; Therese Rassinoux, Neuville-de-Poitue, both of France

[73] Assignee: Saft-Societe des Accumulateurs Fixes et de Traction, Roumainville, France

[22] Filed: Sept. 19, 1974

[21] Appl. No.: 507,573

Related U.S. Application Data

[63] Continuation of Ser. No. 328,029, Jan. 30, 1973, abandoned.

[30] Foreign Application Priority Data

Jan. 31, 1972 France ............................ 72.03141
Mar. 23, 1972 France ............................ 72.10278
Oct. 30, 1972 France ............................ 72.38413

[52] U.S. Cl. ........................ 136/6 LN; 136/100 R; 136/154
[51] Int. Cl.² ................................... H01M 43/06
[58] Field of Search .............. 136/6 LN, 6 R, 83 R, 136/154–155, 137, 100 R, 20

[56] References Cited
UNITED STATES PATENTS

| 3,468,716 | 9/1969 | Eisenberg | 136/100 R |
| 3,658,592 | 4/1972 | Dey | 136/83 R X |
| 3,700,502 | 10/1972 | Watanabe et al. | 136/100 R X |
| 3,726,716 | 4/1973 | Athearn et al. | 136/100 R |

OTHER PUBLICATIONS

Buhner et al., High Energy System (Organic Electrolyte), Feb. 1967 AD648,920 prepared for the U.S. Army Material Command, pp. 1, 2, 3.

*Primary Examiner*—Anthony Skapars
*Attorney, Agent, or Firm*—Kenyon & Kenyon Reilly Carr & Chapin

[57] ABSTRACT

The invention relates to high energy density electrochemical generators of the alkaline, more particularly lithium, negative electrode type. An electrolyte whose solvent contains 1–3 dioxane, dioxolane or propylene oxide, preferably mixed with propylene carbonate or ethylene carbonate is utilized.

This electrolyte has excellent conductivity, even at a relatively slight concentration of the solute. Lithium perchlorate is preferred as the solute and copper oxide, monovalent silver chromate, lead chromate, fluorinated carbons, polymerized fluorinated carbons or mixtures of these latter with metal compounds are preferred as active positive material.

18 Claims, 11 Drawing Figures

ELECTROCHEMICAL GENERATOR

RELATED APPLICATIONS

This is a continuation of application Ser. No. 328,029 filed Jan. 30, 1973, now abandoned.

BRIEF SUMMARY OF INVENTION

This invention relates to electrochemical cells of high energy density type, the negative electrode of which has for its main constituent an alkaline metal, preferably lithium, and the positive electrode of which may comprise various depolarizers. Copper and iron oxides, copper and iron sulfides, monovalent silver chromate and lead chromate, fluorinated carbons with a possible addition of one of the hereabove mentioned metal compounds may be used as depolarizers. Generators of this general type are known in the art. Known electrolytes for such generators are either lithium perchlorate or lithium fluoborate for solute, with a solvent therefor of one or several aprotic organic liquids of high solvating power. Because of this solvating power on the one hand a sufficient amount of the solute can be dissolved in such solvents for obtaining a high electric conductivity and on the other hand the discharge products of the lithium electrode can also be dissolved so that the polarization of the negative electrode of the cell is prevented.

The solvents disclosed in known prior patents were preferably selected among saturated ethers where the solvating power is partly due to the presence of an oxygen atom bearing at least one free electron pair as well as to the fact that the ether is saturated. Thus U.S. Pat. No. 3,542,601 of Nov. 24, 1970 disclosed tetrahydrofuran, tetrahydropyran and 4.4, dimethyl 1-3 dioxane as electrolyte solvents. In the same connection the addition of secondary solvents, more especially to tetrahydrofuran, has been disclosed. U.S. Pat. Nos. 3,511,716 of May 12, 1970 and 3,701,688 of Oct. 31, 1972 both teach the addition of 1-1 or 1-2 dimethoxyethane, and of various other solvents to tetrahydrofuran.

It has now been discovered that the solvating properties of cyclic ethers such as tetrahydrofuran, or aliphatic ethers such as diemthyoxyethane are all the greater as the number No. of oxygen atoms is higher as related to the number Nc of carbon atoms in their respective molecules.

According to the invention the ratio No/Nc is increased and as a consequence the solvating power of the solvent is increased, either by increasing the number No of the oxygen atoms or by decreasing the number Nc of the carbon atoms in the solvent molecule as compared to the tetrahydrofuran molecule.

The preferred ether solvents where No is increased are dioxolane and 1-3 dioxane, both of which have two oxygen atoms and fewer carbon atoms than 4.4. dimethyl 1-3 dioxane (which has also two oxygen atoms). Among the ether solvents where Nc is decreased, the preferred solvent is propylene oxide also called 1.2 epoxy propane or methyloxyrane.

An object and feature of the invention is, therefore, the provision of a high energy density with a negative electrode, the active material of which is an alkaline metal, preferably lithium, with a positive electrode, the active material of which is selected from the group consisting of copper oxide, monovalent silver chromate, lead chromate, fluorinated carbons, polymerized fluorinated carbides and mixtures of the latter with the hereabove mentioned metal compounds, and with a novel electrolyte comprising a solute and at least one solvent, said solvent being constituted by a saturated ether comprising at least one oxygen atom bearing at least one free electron pair, and wherein the saturated ether is selected from the group consisting of 1-3 dioxane, dioxolane and propylene oxide also called 1-2 epoxypropane.

According to an advantageous embodiment, the solute is lithium perchlorate in the concentration range of 1 to 2.5 M.

A preferred embodiment of the invention provides as electrolyte solvent a mixture of a cyclic ether and an ester, the ether being either dioxolane or propylene oxide and the ester being selected from the group consisting of propylene carbonate and ethylene carbonate.

The percentage of ester in such a solvent mixture is advantageously in the range of 10 to 50% by volume.

Other objects and features of the invention are the provision of novel electrolytes for high energy density electrochemical cells whose novel electrolyte includes a solute and a solvent whose solvating power is materially greater than those heretofore known in the art with resultant high electric conductivity and whose use also results in dissolving of discharge products from the negative electrode and thus prevention of polarization of said negative electrode.

Further objects and features of the invention are the provision of electrochemical generators whose performance characteristics are superior to those utilizing electrolytes presently known in the art.

Further objects and features of the invention will become apparent from the following detailed description and accompanying drawings forming part hereof but presented solely by way of example.

IN THE DRAWINGS

Figure 5:
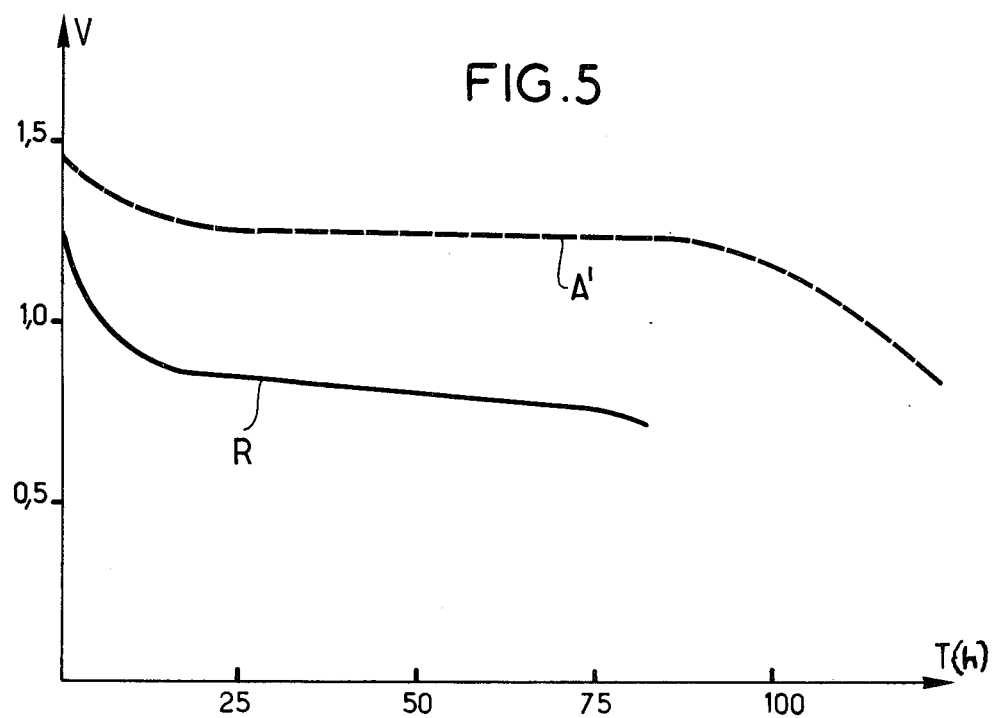
Figure 6:
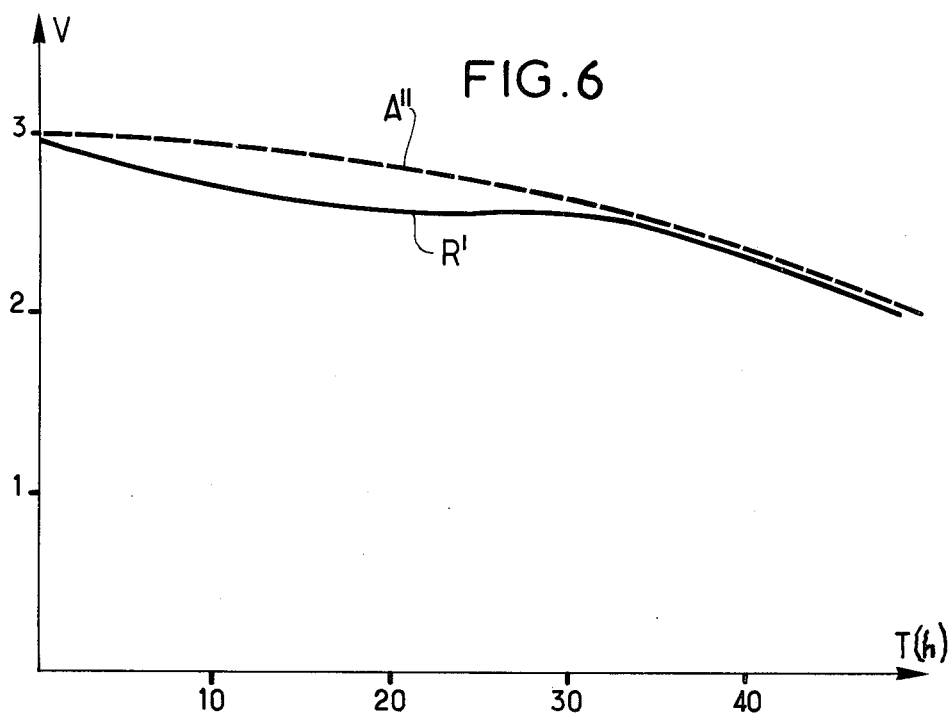

FIGS. 5 and 6 respectively show plots of voltage v. time of the discharge curves of cells made with electrolyte of the above-mentioned types, the respective curves being associated with two different electrolytes; and FIGS. 7 to 11 show plots of voltage v. time respectively of the discharge curves of several lithium cells embodying the invention.

Referring to the drawings, FIGS. 1–4 inclusive depict test result plots of conductivities of different concentration of lithium perchlorate with various different solvent mixtures and in which different percentages by volume of the constituents of said mixtures have been utilized.

DETAILED DESCRIPTION

Figure 1:
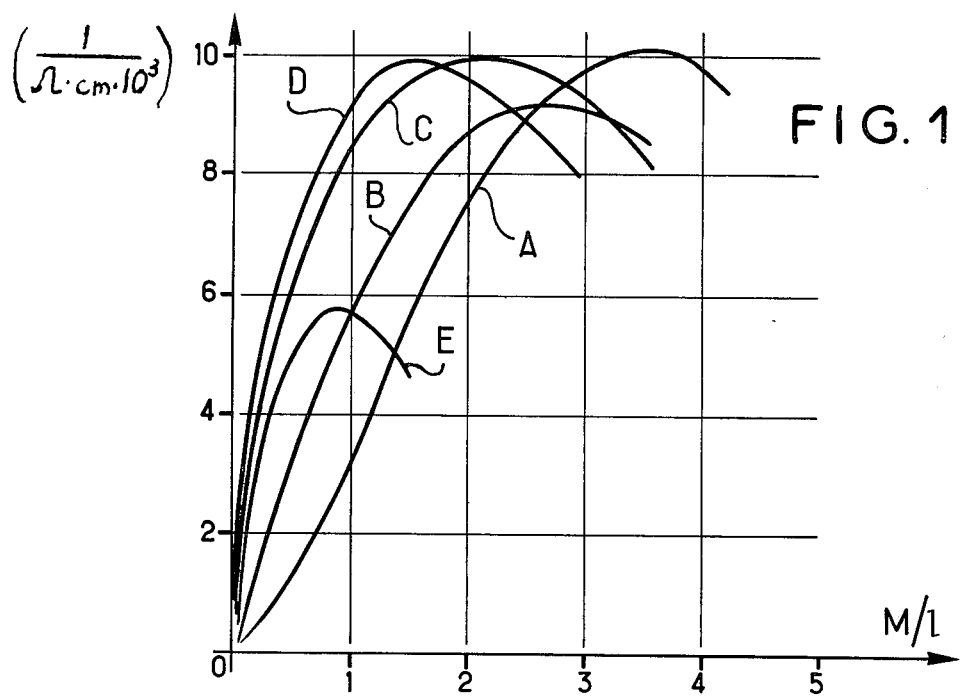
FIG. 1 are plots of the conductivities as ordinates expressed in $10^{-3}\Omega^{-1}cm^{-1}$ plotted against the lithium perchlorate concentrations in moles/liter as abscissae with various percentage by volume of mixtures of dioxolane and propylene carbonate as solvent.

In FIG. 1, the molar concentratons of lithium perchlorate in various mixture solutions have been plotted as abscissae and their conductivities in $10^{-3} \Omega^{-1}$ cm$^{-1}$ are plotted as ordinates. The conductivity measurements were made at 20°C.

For curve A the solvent for lithium perchlorate was pure dioxolane. This solvent was found able to dissolve up to about four moles of lithium perchlorate per liter.

Curves B, C and D relate to lithium perchlorate with different solvent mixtures of dioxolane and propylene carbonate having respectively 10%, 20% and 30% by volume of the latter therein. For curve E the solvent was pure propylene carbonate.

As may be seen on these curves, the addition of propylene carbonate to dioxolane in the solvent mixture shifts the conductivity maximums of the lithium perchlorate-solvent mixtures toward the left without substantially lowering them. Curves B, C and D which relate to mixtures of 10, 20 and 30% propylene carbonate by volume in dioxolane moreover present very broad maximums so that the conductivity remains high for wide ranges of lithium perchlorate concentrations in such mixtures. The value of such a feature is readily seen. Referring to curve C and choosing, for instance, a 2 M concentration of lithium perchlorate whose solvent is a mixture of 20% propylene carbonate and 80% dioxolane both by volume, the conductivity of the solution is found to be $10^{-3}\Omega^{-1}$cm$^{-1}$, i.e., not very different from the conductivity in curve A of a 3 to 3.5M solution of lithium perchlorate in pure dioxolane. Moreover, if the lithium perchlorate concentration should change, which generally occurs during the cell discharge, the conductivity of the solutions with changing concentration will remain relatively unchanged as seen in curve C when the molar concentration of lithium perchlorate either rises to 2.5 M or falls to 1.5 M.

Figure 2:
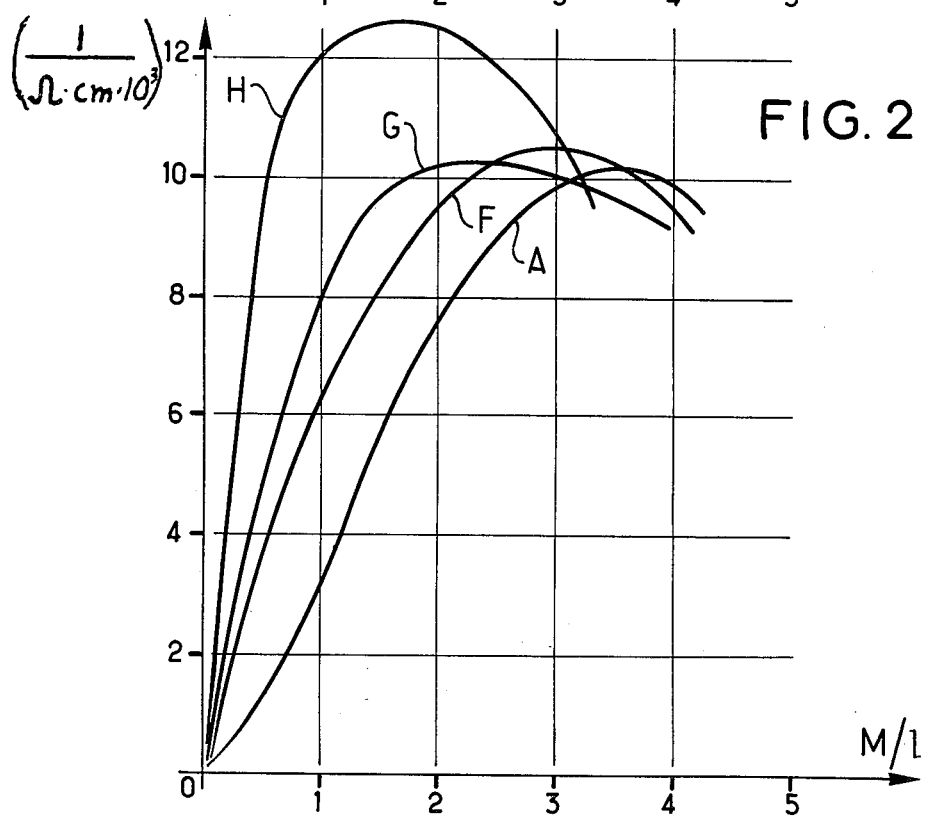
FIG. 2 shows similar plots of the conductivities as ordinates of lithium perchlorate solutions in moles/liter as abscissae for different percentages by volume of mixtures of dioxolane and ethylene carbonate as solvent.

In FIG. 2, in which the same co-ordinates are used as in FIG. 1, curve A where the solvent for the lithium perchlorate is pure dioxolane is again shown. The respective curves F, G and H depict respectively solvents for the lithium perchlorate corresponding to mixtures of 10%, 20% and 35% by volume of ethylane carbonate with dioxolane.

It appears from this Figure that ethylene carbonate as an additive to dioxolane is at least as interesting a component of the solvent mixture as propylene carbonate; it even shows (Curves F, G and H) that conductivity maximums for solutions of lithium perchlorate in such mixtures are higher than those obtained with the same percentages of propylene carbonate as the additive. The addition of ethylene carbonate again shifts the conductivity maximums of the solutions toward the left without lowering them. It may also be seen that when a 1.5M solution of lithium perchlorate in a solvent mixture of 20% by volume ethylene carbonate with dioxolane (curve G) is substituted for a solution of the same concentration in pure dioxolane (curve A), the conductivity of the solution changes from $6.10^{-3}\Omega^{-1}$cm$^{-1}$ to $10.10^{-3}\Omega^{-1}$cm$^{-1}$. For a 35% by volume of ethylene carbonate with dioxolane mixture, the conductivity of the solution reaches $12.10^{-3}\Omega116$ $^{1}$cm$^{-1}$ for a 1.5 M solution.

Figure 3:
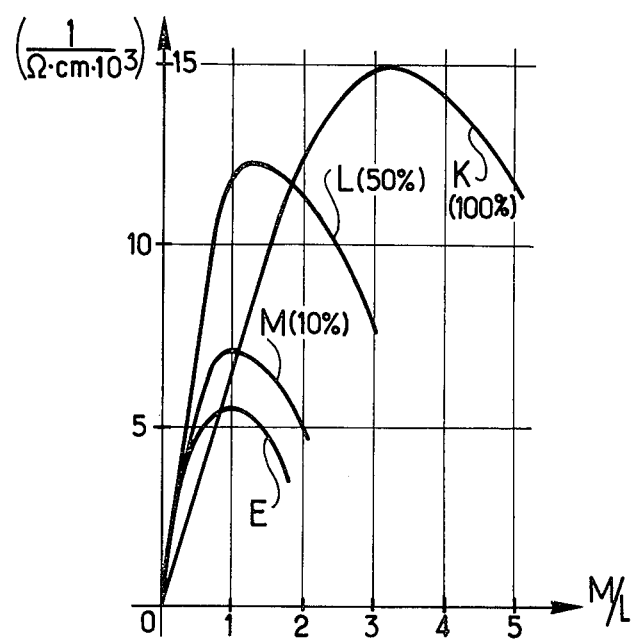
FIG. 3 shows similar plots of electrolyte conductivity for lithium perchlorate concentrations with different percentages by volume of mixtures of propylene oxide and propylene carbonate as solvent.

FIG. 3 shows the conductivities of electrolytes, the solute of which is lithium perchlorate (whose concentrations are plotted in mole/liter as abscissae) and the solvents of which are constituted respectively by pure propylene carbonate for curve E, pure propylene oxide (also called 1-2 epoxy propane or methyl oxirane) for curve K, a 50—50 by volume mixture of these two solvents for curve L and a mixture of 10% propylene oxide and 90% propylene carbonate both by volume for curve M.

It can be observed from this Figure that the addition of propylene carbonate in a 50—50 by volume proportion (curve L), while lessening the volatility of the solvent, gives higher conductivities of electrolyte for corresponding molar solutions of lithium perchlorate than pure propylene oxide (curve E).

Figure 4:
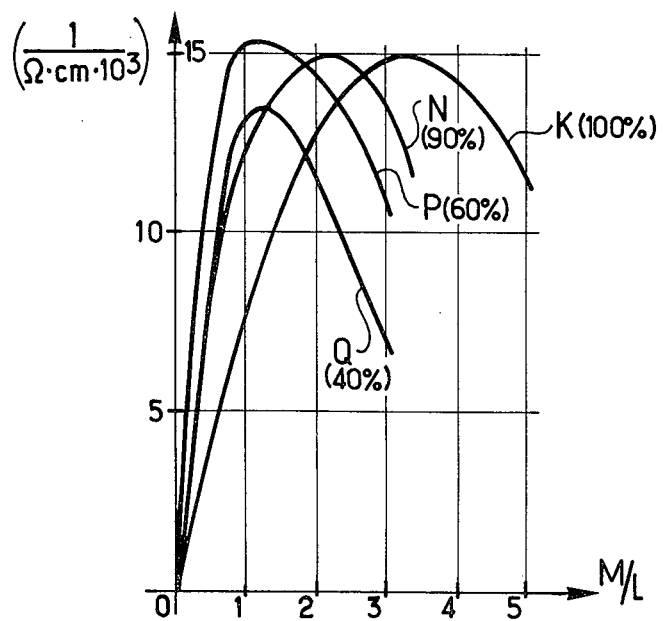
FIG. 4 shows similar plots of electrolyte conductivity also for the lithium perchlorate concentration with various percentages by volume of mixtures of propylene oxide and ethylene carbonate as solvent.

FIG. 4 shows with the same co-ordinates as FIG. 3, the conductivity curves of electrolytes where the solute again is lithium perchlorate, and where curve K identical to curve K of FIG. 3 relates to an electrolyte whose solute is lithium perchlorate, the solvent of which is pure propylene oxide. Curve N relates to an electrolyte whose solute is lithium perchlorate, the solvent of which is a mixture of 10% ethylene carbonate and 90% propylene oxide both by volume. Curve P relates to an electrolyte whose solute is lithium perchlorate, the solvent of which is a mixture of 40% ethylene carbonate and 60% propylene oxide both by volume and curve Q relates to an electrolyte, whose solute is lithium perchlorate, the solvent of which is a mixture of 60% ethylene carbonate and 40% propylene oxide both by volume.

It can be observed from FIG. 4 that in addition to the increase of conductivities of the solutions at lower concentrations of lithium perchlorate, the conductivities of curve P, representing conditions when the solvent is a mixture of 40% ethylene carbonate and 60% propylene oxide both by volume are clearly higher than those of the other curves K, N. or Q.

EXAMPLE I

FIG. 5 shows the discharge curves whose co-ordinates are volts vs. time in hours of the lithium-copper oxide cell systems respectively with two different electrolytes. Curve R, an unbroken line, relates to an electrolyte whose solute is lithium perchlorate and whose solvent is 1-3 dioxane, and curve A', a broken line, relates to an electrolyte whose solute is lithium perchlorate and whose solvent is dioxolane.

The test cells used for deriving these discharge curves were of the button type. They each comprised two lithium anodes 1.2 mm. thick, one cathode 2 mm. thick, and a separator 0.2 mm thick, to which 2 ml. of the said respective electrolytes were added. The electrochemical area in each was 10 cm$^2$. The cells whose discharge curves are shown in FIG. 5 had cooper oxide as positive active material. More precisely, the positive mass contains each by weight 77% copper oxide, 7.7% graphite and 15.3% of a binder such as polytetrafluoroethylene (PTFE). The concentration of lithium perchlorate in each electrolyte was 1.5 M.

Such cells were discharged through a 100 ohms resistor, substantially corresponding to an average output current density of 1mA/cm$^2$, i.e. a current of 10 mA. The best results were obtained with the electrolyte where the solvent was dioxolane (curve A'). However, those cells wherein the electrolyte solvent was dioxane (curve R) though discharged at a rather low voltage, nevertheless gave a rather high capacity. The theoretical capacity of each cell being 1.4 Ah, the respective capacities for cells yielding curves A' and R actually obtained were respectively 1.2 Ah and 0.7 Ah.

EXAMPLE II

FIG. 6 shows curves R', A'' representing discharges across a resistor of 300 Ω of lithium-argentous chromate cells whose electrolytes respectively were the two above-mentioned electrolytes, i.e. that where the solvent was 1-3 dioxane (curve R') and that where the solvent was dioxolane (curve A''). These cells had an identical shape and a similar dimension and components as those of the hereabove described cells from which FIG. 5 was derived, except that copper oxide was replaced in the same weight proportions by argentous chromate. It can be seen that the voltages of the cells with electrolytes with dioxane and dioxolane respectively as solvents do not differ widely, at least at the end of the discharge. The discharges were terminated at 2 volts.

A study of the discharge curves of copper oxide cells noted that the capacity of the cells where the binder was constituted by polytetrafluoroethylene (PTFE) was higher than the theoretical capacity calculated from the amount of copper oxide in the positive electrode.

EXAMPLE III

Figure 7:
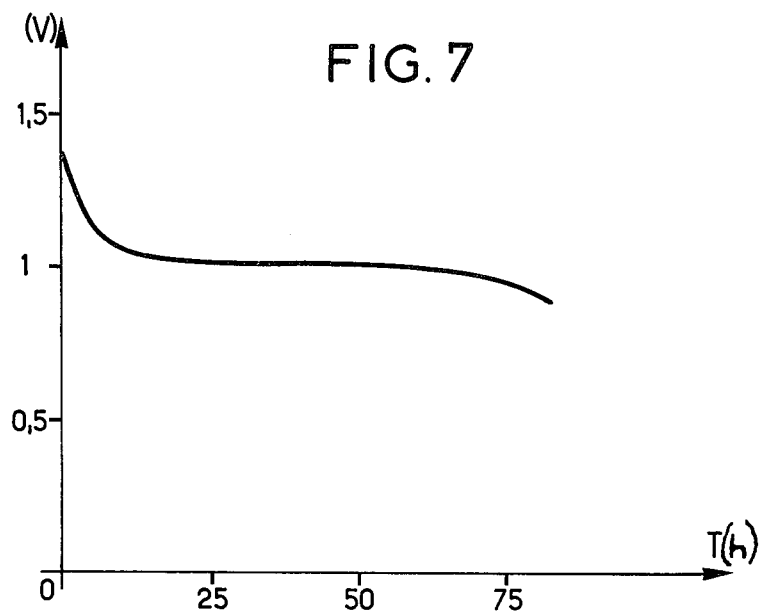

Thus, FIG. 7 shows the discharge curve across a 50 Ω resistor of a cell with a lithium anode (negative electrode) in which the positive electrode, having an overall weight of 3g, comprised by weight 15.3% PTFE, 77% CuO and 7.7% graphite. The electrolyte was a 1.5 molar solution of lithium perchlorate in dioxolane.

The test results are shown in the curve of FIG. 7 where the voltage V in volts are plotted as ordinates and the discharge time T in hours are plotted as abscissae.

The capacity of the cell is about 1.6 Ah for an actual calculated capacity of CuO of about 1.4 Ah.

Thus, it can be concluded PTFE has an electric capacity and the cell discharge has been lengthened by a quantity of electricity which is not negligible.

EXAMPLE IV

Figure 8:
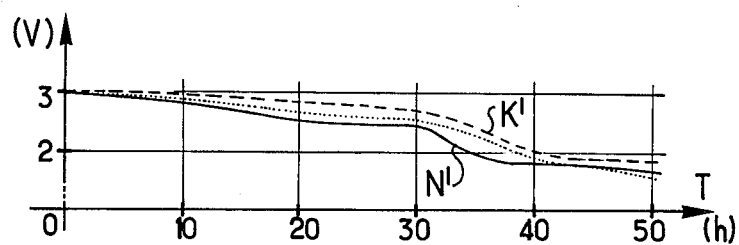

This example relates to lithium cells of the same type as that of FIG. 6, the tests of which are depicted in FIG. 8.

FIG. 8 shows two curves representing discharges of such cells across a 300 ohm. resistor. The discharge time is plotted as abscissae in hours and the voltage as plotted as ordinates in volts.

In this FIG. 8, curve K' in broken line is the discharge curve of a cell of this type wherein the electrolyte was a molar solution of lithium perchlorate in propylene oxide.

Curve N' in unbroken line is the discharge curve of a similar cell where the electrolyte was a molar solution of lithium perchlorate in a mixture of 90% propylene oxide and 10% ethylene carbonate both by volume. As a comparison standard, the same figure shows in dotted line the discharge curve of a cell, the electrolyte of which was a molar solution of lithium perchlorate in a mixture of 80% tetrahydrofuran and 20% propylene carbonate both by volume. The three curves may be seen to be quite comparable.

EXAMPLE V

Figure 9:
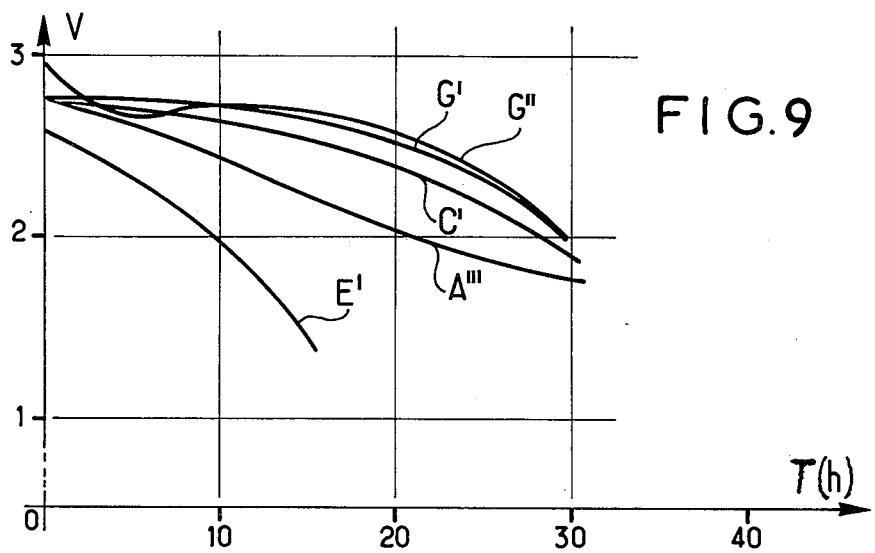
Figure 10:
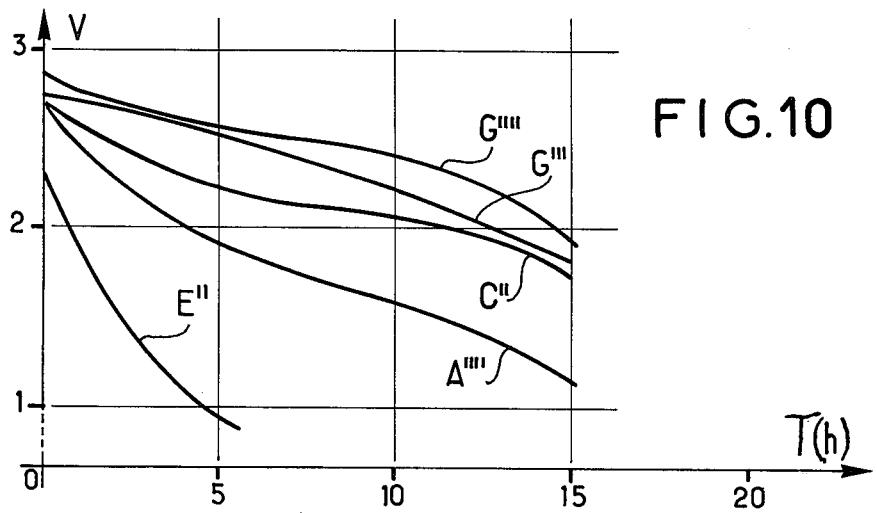

The curves of FIGS. 9 and 10 were obtained with cells of the same type as those of FIG. 6.

FIG. 9 shows the discharge curves of such cells through a 150 Ω resistor. The discharge time in hours has been plotted as abscissae and the cell voltage in volts as ordinates.

Curve A''' is the discharge curve of a cell where the electrolyte was a 1.5 M solution of lithium perchlorate in pure dioxolane.

Curve E' is the discharge curve of a cell where the electrolyte was a 1.5 M solution of lithium perchlorate in pure propylene carbonate.

Curve C' is the discharge curve of a cell where the electrolyte solvent was constituted by a mixture of either 20% or 35% propylene carbonate and either 80% or 65% of dioxolane both by volume. The cells having electrolyte solvents constituted by mixtures at both these percentages gave the same results. The lithium perchlorate concentration as before was 1.5 m.

Curve G' is the discharge curve of cells where the electrolyte solvent is constituted by a mixture of either 80% or 65% dioxolane and either 20% or 35% ethylene carbonate both by volume. Solvent mixtures at both these percentages gave the same results. The lithium perchlorate concentration was 1.5 M.

Curve G'' is the discharge curve of cells whose electrolyte was constituted by a mixture of 80% dioxolane and 20% ethylene carbonate both by volume with a 2.5M lithium perchlorate solute.

As shown by curves C', G', G'', the discharge performances of cells where the electrolyte solvents were constituted by mixtures, are always better than those curves E' and A''' of the cells where the solvent was pure.

It should be noted for this discharge rate through a 150 Ω resistor, no appreciable gain was obtained by increasing the concentration of lithium perchlorate solute in the solvent mixtures of dioxolane and ethylene carbonate.

EXAMPLE VI

FIG. 10 shows with the same co-ordinates the discharge curves of cells identical with the cells of Example V discharged through a 75 Ω resistor.

Curve E'' is the discharge curve of a cell identical to that which yielded curve E' in FIG. 9, i,e., where the solvent was pure propylene carbonate.

Curve A'''' is the discharge curve of a cell identical to that which yielded curve A''' of FIG. 9, i.e. where the solvent was pure dioxolane.

Curve C'' is the discharge curve of cells identical to those two which yielded curve C' of FIG. 9. The discharge curves of the two cells respectively with both solvent mixtures that yielded curve C' of FIG. 9 are alike.

Curve G''' is the discharge curve of cells identical to those two which yielded curve G' of FIG. 9. The discharge curves of the two cells respectively with both solvent mixtures that yielded curve G' of FIG. 9 are alike.

Curve G'''' is the discharge curve of a cell identical to that of curve G'' of FIG. 9. It can be seen from curves C'', G''' and G'''' that with the same solute concentration (1.5 M) the discharge curves of cells where the solvent is a mixture all are above those of cells with a pure solvent, curves E'' and A''''.

EXAMPLE VII

Figure 11:
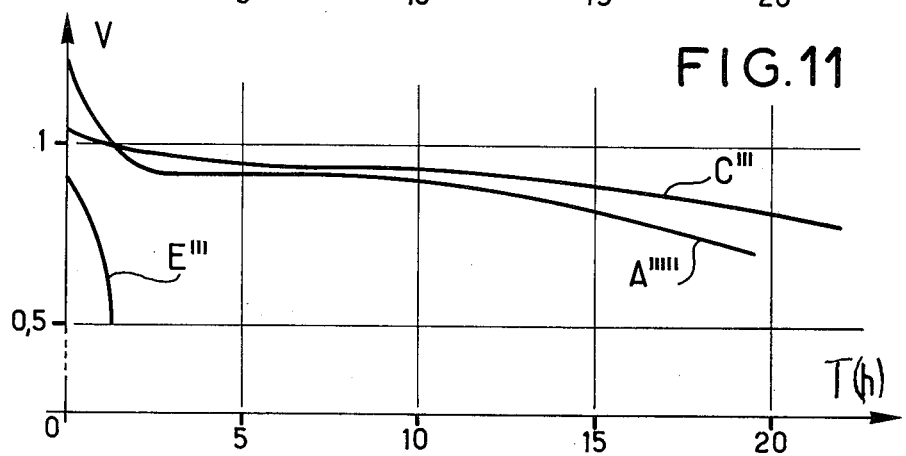

FIG. 11 shows with the same co-ordinates the discharge curves of similar cells wherein the copper oxide of the positive electrode was substituted in the same proprotion for silver chromate. Such cells were discharged through a 20 Ω resistor.

Curve E''' is the discharge curve of a cell where the electrolyte solvent was propylene carbonate, the solute lithium perchlorate concentration being 1.5 M.

Curve A''''' is the discharge curve of a cell where the electrolyte solvent was constituted by pure dioxolane and where the lithium perchlorate concentration again was 1.5 M.

Curve C''' is the discharge curve of a cell where the lithium perchlorate concentration was either 1.5 or 2.5 M and the solvent was a mixture of either 80 or 65% dioxolane by volume and either 20 or 35% propylene carbonate or ethylene carbonate by volume. The discharge curves of cells comprising all these various electrolytes were substantially the same. Curve C''' may be seen to be above curve A''''' for most of its length.

All these examples show the value of using electrolytes in such cells wherein the solvent is constituted by a mixture of dioxolane with either ethylene carbonate or propylene carbonate, more especially in cells where the positive active material is silver chromate. For the same concentrations of lithium perchlorate in such cells the performances are better with the solvent mixtures than with a pure solvent.

Moreover, the performances of such cells are at least as good with lower concentrations of lithium perchlorate, which is a rather expensive constituent of the cells. It is therefore of value to be sparing of it.

Another advantage is that since the solubility of lithium perchlorate is high in such mixtures, if the original concentration thereof is low, saturation is not easily reached during cell discharge and there is no concentration polarization on the electrodes during discharge. For the same reason, since saturation is not easily reached, the cell performances at low temperature are improved. Lastly, since the useful concentration of lithium perchlorate required is rather low, the viscosity of the electrolyte solutions is not very high, especially not with the lowest percentages of ethylene carbonate in the solvent mixtures so that the mobility of ions during cell operation is improved.

While specific embodiments of the invention have been described, variations within the scope of the appended claims are possible and are contemplated. There is no intention, therefore, of limitation to the exact disclosure herein presented.

What is claimed is:

1. Electrochemical cell with a negative electrode, the active material of which is lithium, with a positive electrode, the active material of which is selected from the group consisting of copper oxide and monovalent silver chromate and with an electrolyte in said cell comprising a solute and at least one solvent consisting of an ether selected from the group consisting of 1-3 dioxane, dioxolane and propylene oxide.

2. Electrochemical cell according to claim 1, wherein the electrolyte solute is lithium perchlorate.

3. Electrochemical cell according to claim 2, wherein the concentration of lithium perchlorate is in the range of 1 to 2.5 M.

4. Electrochemical cell with a negative electrode, the active material of which is lithium, with a positive electrode, the active material of which is selected from the group consisting of copper oxide and monovalent silver chromate and with an electrolyte in said cell comprising a solute and at least one solvent which is a mixture consisting of from 10–50% of an ester selected from the group consisting of propylene carbonate and ethylene carbonate and the balance being 90–50% of an ester selected from the group consisting of propylene oxide and dioxolane.

5. For use in an electrochemical generator of the type including a negative electrode whose active material is lithium, and whose positive electrode contains active material selected from the group consisting of copper oxide and monovalent silver chromate, an electrolyte comprising a solute and at least one solvent, said solvent consisting of a saturated ether selected from the group consisting of 1-3 dioxane, dioxolane and propylene oxide.

6. For use in an electrochemical generator of the type including a negative electrode whose active material is lithium, and whose positive electrode contains positive active material selected from the group consisting of copper oxide and monovalent silver chromate, an electrolyte comprising a solute and at least one solvent, said solvent consisting of a mixture of from about 90% to about 50% by volume of an ether selected from the group consisting of dioxolane and propylene oxide and the balance being an ester selected from the group consisting of propylene carbonate and ethylene carbonate.

7. For use in an electrochemical cell according to claim 5, an electrolyte wherein said solute in said solvent is lithium perchlorate.

8. Electrochemical cell with a negative electrode, the active material of which is lithium and with a positive electrode selected from the group consisting of copper oxide and monovalent silver chromate and with an electrolyte in said cell comprising a solute and one solvent, said solvent consisting of an ether selected from the group consisting of 1-3 dioxane, dioxolane and propylene oxide.

9. Electrochemical cell with a negative electrode, the active material of which is lithium and with a positive electrode selected from the group consisting of copper oxide and monovalent silver chromate and with an electrolyte in said cell comprising a solute and one solvent, said solvent consisting of propylene oxide 10. Electrochemical cell according to claim 8 wherein said solute is a lithium perchlorate whose concentration ranges from 1 to 2.5M.

11. Electrochemical cell with a negative electrode, the active material of which is lithium, with a positive electrode selected from the group consisting of copper oxide and monovalent silver chromate and with an electrolyte comprising a solute and a solvent, said solvent consisting of a mixture of from about 90% to about 50% by volume of an ether selected from the group consisting of dioxolane and propylene oxide, and the balance from about 10% to about 50% by volume of an ester selected from the group consisting of propylene carbonate and ethylene carbonate.

12. For use in an electrochemical generator, an electrolyte according to claim 7, wherein said solute is lithium perchlorate whose concentration ranges from 1 to 2.5M.

13. For use in an electrochemical generator of the type including a lithium containing negative electrode, a positive electrode, the active material of which is selected from the group consisting of copper oxide and monovalent silver chromate, and electrolyte comprising lithium perchlorate as solute, and a solvent, said solvent consisting of propylene oxide.

14. For use in an electrochemical generator of the type including a lithium containing negative electrode, a positive electrode selected from the group consisting of copper oxide and monovalent silver chromate, an electrolyte comprising lithium perchlorate solute whose concentration ranges from approximately 1 to 2.5M, a solvent consisting of a mixture of from about 90% to about 50% of propylane oxide, and the balance from about 10% to about 50% of an ester selected from the group consisting of propylene carbonate and ethylene carbonate.

15. Electrochemical cell according to claim 4 wherein said solute is lithium perchlorate.

16. Electrochemical cell according to claim 15 wherein said lithium perchlorate is present in a concentration ranging from 1 to 2.5M.

17. Electrochemical cell according to claim 4 wherein said ether consists of propylene oxide.

18. Electrochemical cell according to claim 1 wherein said solvent consists of propylene oxide.

* * * * *